(12) United States Patent
Onoe (10) Patent No.: US 6,741,765 B2
(45) Date of Patent: May 25, 2004

(54) OPTICAL INTEGRATED CIRCUIT AND METHOD FOR MANUFACTURING OPTICAL INTEGRATED CIRCUIT

(75) Inventor: Atsushi Onoe, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 226 days.

(21) Appl. No.: 10/098,433

(22) Filed: Mar. 18, 2002

(65) Prior Publication Data

US 2002/0131669 A1 Sep. 19, 2002

(30) Foreign Application Priority Data

Mar. 19, 2001 (JP) ..................................... P2001-077824

(51) Int. Cl.[7] ................................................ G02B 6/12
(52) U.S. Cl. ......................................... 385/14; 385/131
(58) Field of Search ............................ 385/14, 43, 129, 385/130, 131, 188

(56) References Cited

U.S. PATENT DOCUMENTS 5,051,372 A * 9/1991 Sasaki .......................... 438/59
6,078,707 A * 6/2000 Yamamoto et al. ........... 385/14
6,323,480 B1 * 11/2001 Tran et al. ................ 250/214.1

* cited by examiner

Primary Examiner—Sandra O'Shea
Assistant Examiner—Sumati Krishnan
(74) Attorney, Agent, or Firm—Sughrue Mion, PLLC (57) ABSTRACT

The present invention discloses an optical IC including a photo-detector formed on a substrate, at least one light-blocking film layer formed in a portion of the main surface of the substrate other than the portion where the light-detector is formed, at least two insulator film layers formed so as to cover the light-blocking film layer, a clad layer formed consecutively over the photo-detector and the insulator film layers, and an optical wave-guide path layer formed on the clad layers, in which the insulator film layers are formed so as to form a plurality of staircase-like steps toward the photo-detector.

11 Claims, 7 Drawing Sheets

OPTICAL INTEGRATED CIRCUIT AND METHOD FOR MANUFACTURING OPTICAL INTEGRATED CIRCUIT

BACKGROUND OF THE INVENTION

1. Field of the Invention

The present invention relates to an optical integrated circuit (IC) and method for manufacturing the same and, more particularly to, such an optical IC and method for manufacturing the same that can reduce a scatter loss of an optical signal.

2. Description of the Related Art

In a conventional optical IC practically used in optical pick-up or optical-fiber communication, typically an optical element such as a lens is used to guide a light which has propagated a space, to then detect it by a photo-detector.

Figure 7:
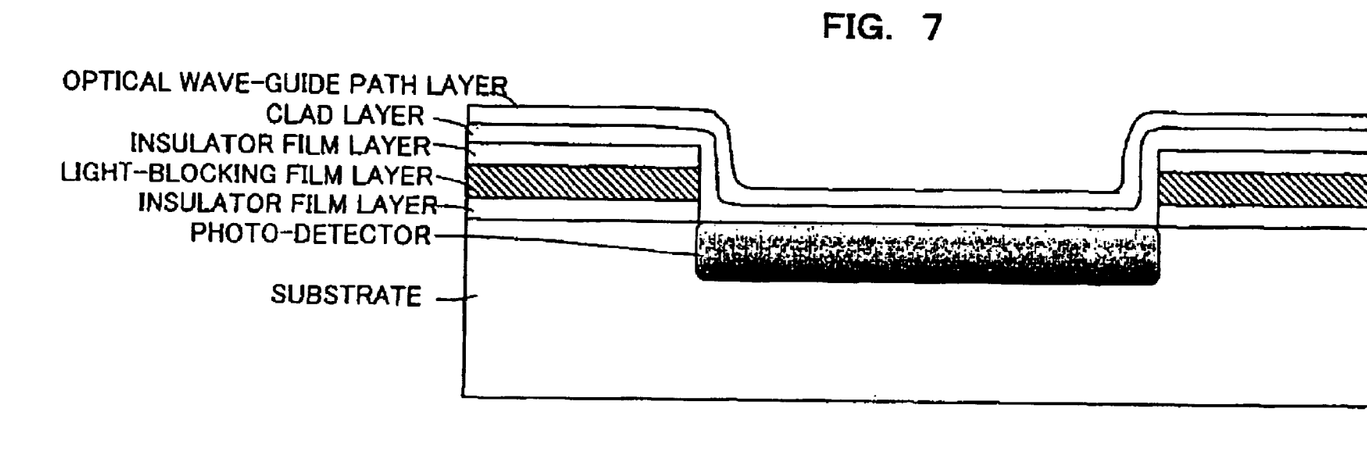
FIG. 7 is a cross-sectional view for showing one example of a construction of a prior art optical IC.

Such a optical IC, however, is expected to be of a wave-guide path type so as to reduce the number of the optical elements used therein and hence the costs thereof as well as to have more functions by use of, for example, an electro-optic effect. FIG. 7 is a cross-sectional view for showing one example of a configuration of a wave-guide path type photo-detector which is manufactured on the optical IC substrate. As shown in FIG. 7, on the substrate of the optical IC, to avoid erroneous detection of stray light which hit a portion other than a photo-detector formed on the substrate to detect an optical signal which has propagated a space, to block light, typically a light-blocking film layer made of metal such as aluminum is provided at the portions other than the photo-detector. Moreover, avoid corroding of this light-blocking film layer, it is typically sandwiched by insulator film layers.

A wave-guide path type photo-detector construction by use of an optical IC substrate having such a configuration, however, has suffered from a problem that, as shown in FIG. 7, an insulator film layer and a light-blocking film layer are formed as stacked on the substrate to thereby form a steep step with a value on the micrometer order at a boundary between a photo-detecting portion and such a portion of the light-blocking film layer that surrounds the photo-detecting portion, so that the resultant bent portion has a large radiation loss of the light propagating an optical wave-guide layer.

Furthermore, since this step is step, a clad layer is liable to be cracked at its step portion, which constitutes another problem.

Further, to polish such a steep step at the boundary of the light-blocking film layer for improvement of the performance, the costs are increased, which constitutes a further problem.

Those problems become more remarkable as the numbers of the insulator film layers and the light-blocking film layers increase when the optical IC employs a multi-layer wiring configuration.

SUMMARY OF THE INVENTION

It is therefore an object of the present invention to provide an optical IC and method for manufacturing the same that can reduce the scatter loss of an optical signal easily and inexpensively.

The above object of the present invention can be achieved by an optical integrated circuit provided with: a photo-detector formed on a substrate; at least one light-blocking film layer which is formed in a portion of a main surface of the substrate other than the portion where the photo-detector is formed; at least two insulator film layers which are formed so as to cover the light-blocking film layer; a clad layer which is formed consecutively over the light-detector and the insulator film layers; and an optical wave-guide path layer formed on the clad layer, wherein the clad layer is formed in a smooth slope toward the photo-detector.

According to the present invention, the clad layer is formed as a smooth slope, so that the wave-guide path layer can have a smooth slope (that is, smooth step structure) formed thereon, to thereby guide a light with a low loss. It also makes it possible to reduce the scatter loss of an optical signal at the bent portion of the light-blocking film layer.

In one aspect of the optical integrated circuit of the present invention, the insulator film layers form a plurality of staircase-like steps, each of which has a horizontal length measuring at least ½ of a maximum film thickness of the light-blocking film layer. Namely, each of the steps is formed in an interval measuring at least ½ of a maximum film thickness of the light-blocking film layer.

According to this aspect, the inclination of the steps in a staircase is made moderate, so that the step can be buried smooth, to thereby form such an optical wave-guide path layer that has an even smoother slope (that is, smooth step structure).

In another aspect of the optical integrated circuit of the present invention, the insulator film layers each have a film thickness measuring at least ⅓ of the maximum film thickness of the light-blocking film layer.

According to this aspect, the inclination of the steps in a staircase is made moderate, so that the step can be buried smooth, to thereby form such an optical wave-guide path layer that has an even smoother slope (that is, smooth step structure).

In further aspect of the optical integrated circuit of the present invention, the insulator film layer have an inclined face having an inclination angle smaller than 90 degrees toward the photo-detector.

According to this aspect, the inclination of the steps in a staircase is made moderate, so that the step can be buried smooth, to thereby form such an optical wave-guide path layer that has an even smoother slope (that is, smooth step structure).

In further aspect of the optical integrated circuit of the present invention, the lowest one of the insulator film layers is formed so as to cover the photo-detector.

The above object of the present invention can be achieved by an optical integrated circuit provided with: at least one night-blocking film layer which is formed in a portion of a main surface of the substrate other than the portion where the photo-detector is formed; at least two insulator film layers which are formed so as to cover the light-blocking film layer; a clad layer which is formed consecutively over the light-detector and the insulator film layers; and an optical wave-guide path layer formed on the clad layer, wherein the insulator film layers form a plurality of staircase-like steps toward the photo-detector.

According to the present invention, a multi-layer film underlying the clad layer is adapted to form, in construction, steps in a staircase at the boundary between the photo-detector and any other portions, so that when the clad layer is formed thereon, the optical wave-guide path layer can have a smooth slope (that is, smooth step structure) formed thereon, to thereby guide light with a low loss. It also makes it possible to reduce the scatter loss of an optical signal at the bent portion of the light-blocking film layer.

Furthermore, it is unnecessary to polish the steep step at the boundary of the light-blocking film layer for improvement of the performance, so that this steep step at the boundary of the light-blocking film layer can be smoothed only by etching, thus manufacturing the optical IC simply and inexpensively.

In one aspect of the optical integrated circuit of the present invention, each of which has a horizontal measuring at least ½ of a maximum film thickness of the light-blocking film layer.

According to this aspect, the inclination of the steps in a staircase is made moderate, so that the step can be buried smooth, to thereby form such an optical wave-guide path layer that has an even smoother slope (that is, smooth step structure).

In another aspect of the optical integrated circuit of the present invention, the insulator film layers each have a film thickness measuring at least ⅓ of the maximum film thickness of the light-blocking film layer.

According to this aspect, the inclination of the steps 10 in a staircase is made moderate, so that the step can be buried smooth, to thereby form such an optical wave-guide path layer that has an even smoother slope (that is, smooth step structure).

In further aspect of the optical integrated circuit of the present invention, the insulator film layer have an inclined face having an inclination angle smaller than 90 degrees toward the photo-detector.

According to this aspect, the inclination of the steps in a staircase is made moderate, so that the step can be buried smooth, to thereby form such an optical wave-guide path layer that has an even smoother slope (that is, smooth step structure).

In further aspect of the optical integrated circuit of the present invention, the lowest one of the insulator film layers is formed so as to cover the photo-detector.

The above object of the present invention can be achieved by a method for manufacturing an optical integrated circuit provided with: a process of forming at least one light-blocking film layer in a portion of a main surface of a substrate other than the portion where a photo-detector is formed; a process of forming a insulator film layer having a staircase-like step so as to cover the light-blocking film layer toward the photo-detector; a process of forming a clad layer having a smooth slope by pouring a liquefied derivative material prepared to have appropriate viscosity onto the staircase-like step; and a process of forming an optical wave-guide path layer on the clad layer.

According to the present invention, the optical IC of the present invention can be manufactured.

DESCRIPTION OF THE PREFERRED EMBODIMENTS

The following will describe preferred embodiments of the present invention with reference to the drawings. First, a configuration etc. of an optical IC according to an embodiment of the present invention with reference to FIG. 1.

Figure 1:
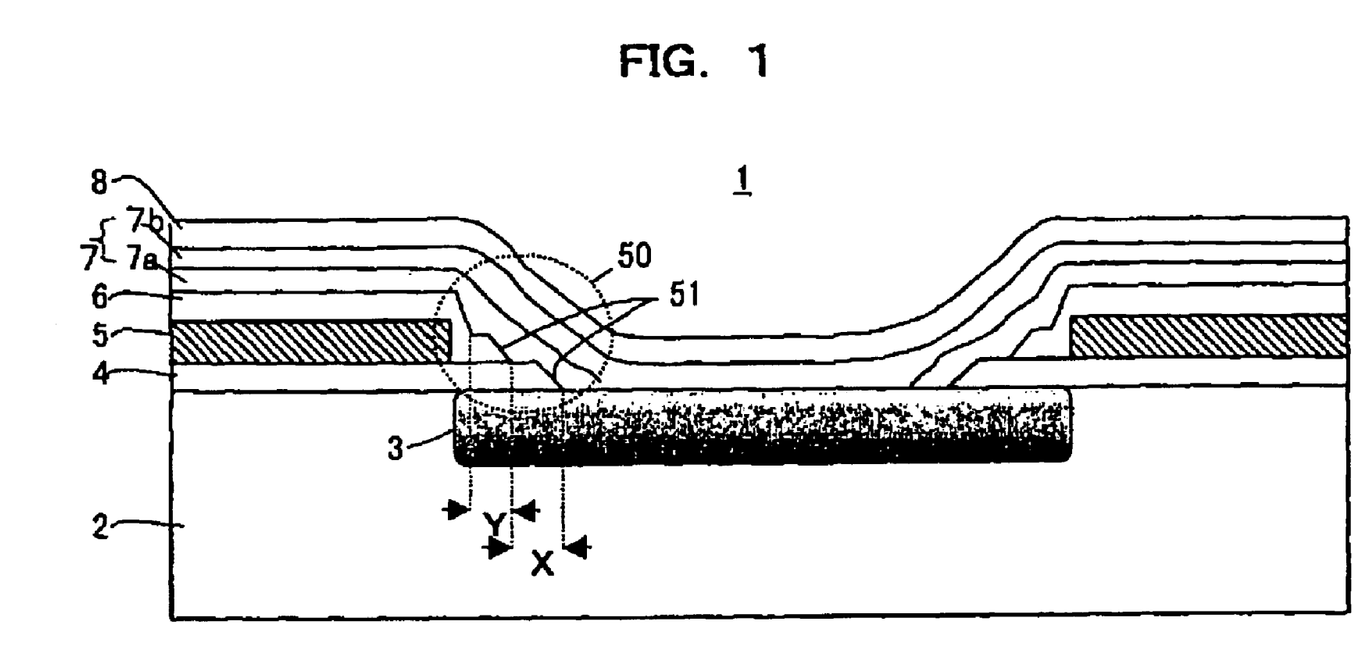
FIG. 1 is a cross-sectional view for showing an example of a construction of an optical IC according to an embodiment of the present invention.

FIG. 1 shows an example of a cross-sectional construction of an optical IC according to the embodiment of the present invention. An optical IC 1 comprises a photo-detector 3 formed on part of the main surface of a silicon (Si) substrate 2, a light-blocking film layer 5 formed on the portions other than that where the photo-detector 3 is formed, a first insulator film layer 4 and a second insulator film layer 6 formed so as to sandwich the light-blocking film layer 5 therebetween, a clad layer 7 formed on the photo-detector 3 and the insulator film layers 4 and 6, and an optical wave-guide path layer 8 formed on the clad layer 7.

In the example of FIG. 1, the first insulator film layer 4 pushes out over the photo-detector 3, the end face of the light-blocking film layer 5 formed on which roughly agrees with the end face of the photo-detector 3 vertically. The light-blocking film layer 5 is buried as sandwiched by the first insulator film layer 4 and the second insulator film layer 6, which has its end face formed on the first insulator film layer 4, thus forming a staircase-like step in a region (over the photo-detector 3) which extends from the end face of the light-blocking film layer 5 toward the photo-detector 3 as shown in a portion 50 encircled by a broken line of FIG. 1. Such a staircase construction formed by the insulator film layers 4 and 6 is actually provided by the later described etching processing.

In the staircase-like steps shown in the broken-line portion 50 of FIG. 1, the horizontal step lengths X and Y each are preset to be not less than ½ of the maximum film thickness of the light-blocking film layer 5. Moreover, the film thickness of the insulator film layers 4 and 6 is preset to be not less than ⅓ of that of the light-blocking film layer 5.

The end faces (indicated by reference numeral 51) of the first insulator film layer 4 and the second insulator film layer 6 are forwardly tapered, that is, have a slope inclined at an inclination angle smaller than 90 degrees (that is, the angle "AG" between the end face of the insulator film layer and the photo-detector is set to be 0<AG<90°).

On this multi-layer film having such a staircase construction is formed the clad layer 7. This clad layer 7 consists of a first sub-clad layer 7a and a second sub-clad layer 7b, which are formed by spin-coating SOG, which is a liquefied derivative material prepared to have appropriate viscosity, to apply it and then hardening it. Such a region of this clad layer 7 that extends from the end face of the light-blocking film layer 5 toward the photo-detector 3 has a smoother slope. This is because, in the substrate 2 having a multi-layer cross-sectional construction, the layers (light-blocking film layer 5, first insulator film layer 4, and second insulator film layer 6) have no cross section at the same position to thereby provide such a cross-sectional structure that is staircase-wise shaped sequentially from the end face of the light-blocking film layer 5 toward the photo-detector 3 and also because the insulator film layers 4 and 6 having this staircase construction have their end faces tapered forward.

On this clad layer 7 is formed an optical wave-guide path layer 8. The optical wave-guide path layer 8 is formed by sputtering, CVD, etc. on the clad layer 7 having a smooth slope and, therefore, has also a smooth slope (smooth step structure) in a region that extends from the end face of the light-blocking film layer 5 toward the photo-detector 3, thus resultantly enabling guiding light with a low loss along this smooth slope. In addition, it is possible to decrease the scatter loss of the optical signal at the bent portion of the light-blocking film layer 5.

The following will describe one example of a method of manufacturing the optical IC 1.

First, on one main surface of the Si substrate 2, a $SiO_2$ layer is grown by thermal oxidation to a thickness of 500 nanometer or so to thereby form the first insulator film layer 4. Furthermore, the photo-detector 3 is formed on the Si substrate 2 using a known process.

Figure 2A:
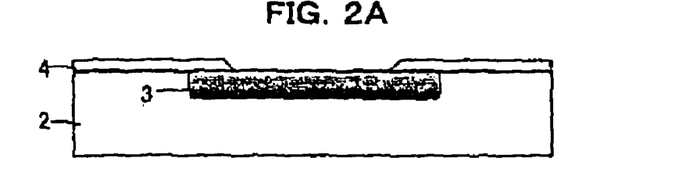
FIGS. 2A to 2E are views for explaining sequential processes of manufacturing an optical IC 1.

Next, a patterned resist is used as an etching mask to etch the first insulator film layer 4 thus formed on the Si substrate 2 at a predetermined position over the photo-detector 3 to make an opening (FIG. 2A). For example, by conducting wet etching on the first insulator film layer 4 using buffered hydrofluoric acid at the room temperature, the etching end face of the first insulator film layer 4 is forward tapered at an angle of about 50–60 degrees with respect to the surface of the photo-detector 3. This is because an interface between the first insulator film layer 4 and the resist undergoes etching by buffered hydrofluoric acid at a rate higher than that for an interface between the first insulator film layer 4 and the Si substrate 2.

Note here that such a forward taper of the etching end face can be formed also by RIE etching, by which a fluorine-based gas is employed using as a mask such a resist that has a forward tapered shape.

Figure 2B:
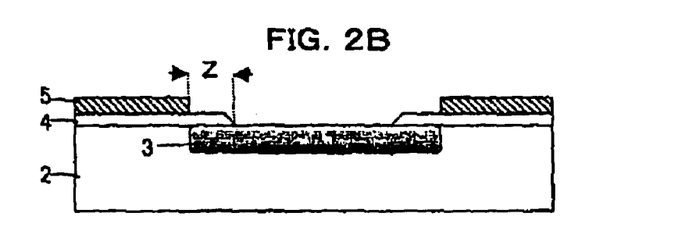

Next, metal (e.g., aluminum) is evaporated by vacuum evaporation etc. on the photo-detector 3 and the first insulator film layer 4 to thereby form the light-blocking film layer 5 and then etch it using a patterned resist at its predetermined position over the first insulator film layer 4 to make an opening (FIG. 2B). Preferably the end face of this light-blocking film layer 5 is formed tapered forward with respect to the surface of the photo-detector 3.

The light-blocking film layer 5 is to be thick enough to prevent stray light applied from the above from reaching the Si substrate 2.

In this process, preferably the film thickness of the first insulator film layer 4 is at least ⅓ of that of the light-blocking film layer 5. Further, preferably a horizontal length Z from the end face of the first insulator film layer 4 to that of the light-blocking film layer 5 is set using an etching mask so that after the second insulator film layer 6 is formed as described later, the horizontal step (an interval of step) length X of the first insulator film layer 4 may be at least ½ of the maximum film thickness of the light-blocking film layer 5.

Figure 2C:
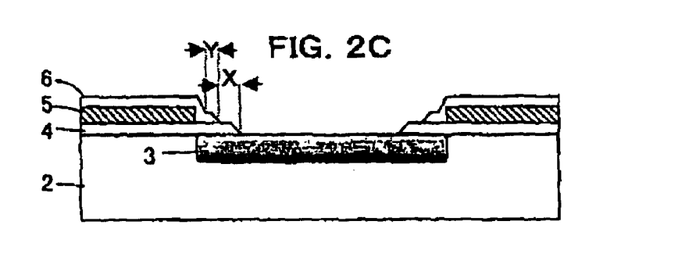

Next, a $SiO_2$ film is formed using CVD, RF sputtering, etc. on the photo-detector 3, the first insulator film layer 4 and the light-blocking film layer 5 to thereby form the second insulator film layer 6. This second insulator film layer 6 is then etched using a patterned resist as an etching mask at its predetermined position over the photo-detector 3 and the first insulator film layer 4 to thereby make an opening (FIG. 2C). For example, like in the above-mentioned case of etching the first insulator film layer 4, by conducting wet etching on the second insulator film layer 6 using buffered hydrofluoric acid at the room temperature, the etching end face of the second insulator film layer 6 is formed forward tapered forming an angle of about 50–60 degrees with respect to the surface of the photo-detector 3. Note here that both the second insulator film layer 6 and the first insulator film layer 4 have a moderate step shape because they are formed sequentially as spaced from the end face of the light-blocking film layer 5.

Furthermore, preferably the film thickness of the second insulator film layer 6 on the light-blocking film layer 5 is at least ⅓ of that of the light-blocking film layer 5.

Next, on the photo-detector 3 and the insulator film layer 4, SOG, which is a liquefied derivative material prepared to have appropriate viscosity, is spin-coated and hardened to form the first sub-clad layer 7a having a first refractive index $n_1$. This first sub-clad layer 7a has a smooth slope. This is because, as mentioned above, it has a cross-sectional structure that is staircase-wise shaped sequentially from the end face of the light-blocking film layer 5 toward the photo-detector 3 and also because the insulator film layers 4 and 6 having this staircase construction have their end faces tapered forward.

That is, thus spin-coated liquefied SOG can smoothly bury the staircase-like step structure by its surface tension. Moreover, since the end faces of the insulator film layers 4 and 6 are formed forward tapered to provide a moderate staircase, the stress that occurs when the SOG is applied and hardened can be released readily. It is, therefore, possible to prevent cracking of the first sub-clad layer 7a at the steps.

Further, by setting the horizontal lengths (X and Y) of the staircase-like steps brought by the insulator film layers 4 and 6 which form the staircase construction to at least ½ of the film thickness of the light-blocking film layer 5, the inclination of the staircase-like steps can be made moderate, so that the steps can be easily buried in by the SOG when it is applied and hardened. Additionally, by setting the film thicknesses of the insulator film layers 4 and 6 to at least ⅓ of that of the light-blocking film layer 5, the inclination of the staircase-like steps can be made moderate further, so that the steps can be easily buried in by the SOG when it is applied and hardened.

Figure 2D:
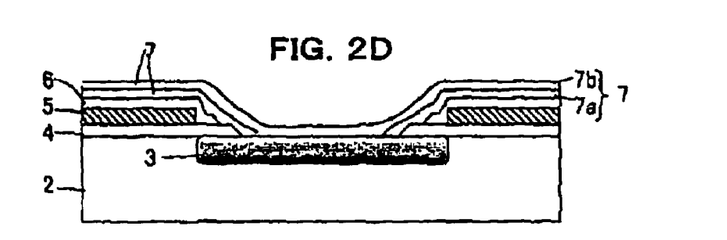

Next, the sub-clad layer 7a is subjected to RIE etching (by use of $CF_4$ gas) at such a portion thereof that is over the photo-detector 3, to thereby open a light reception face in the photo-detector 3. Then, on this light reception face is again applied the SOG thin and hardened to thereby form the second sub-clad layer 7b (FIG. 2D). A step newly formed by this RIE etching of the first sub-clad layer 7a is also made tapered forward with respect to the surface of the photo-detector 3. This provides the second sub-clad layer 7b with a further smoother slope in its region from the end face of the light-blocking film layer to the photo-detector 3. That is, the second sub-clad layer 7b has a slope smoother than such a slope of the first sub-clad layer 7a that is made smooth by the insulator film layers 4 and 6 which form the above-mentioned staircase-like construction.

Furthermore, the film thickness of the second sub-clad layer 7b which covers the above-mentioned opening made by etching over the photo-detector 3 is to be small enough for guided light propagating the optical wave-guide path layer 8 formed thereon to be radiated to and detected by the photo-detector 3. The film thickness of the clad layer at a portion other than those over the photo-detector 3 (film thickness of first sub-clad layer 7a+film thickness of second sub-clad layer 7b), on the other hand, is to be large enough to satisfy the light-trapping effect of the optical wave-guide path layer 8.

Note here that the clad layer 7 may be made of SOG as well as polyimide or acrylic resin.

Figure 2E:
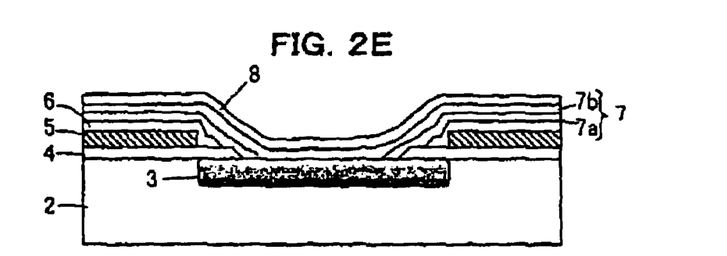

Next, on the clad layer 7 thus formed as an underlying layer is formed by sputtering, CVD, etc. the optical wave-guide path layer 8 to a thickness of 0.7 micrometer (micron) and which has a second refractive index $n_2$ (FIG. 2E). This optical wave-guide path layer 8 may be made of Coning 7059, $SiO_2$, $Si_3N_4$, etc. Note here that the refractive indexes $n_1$, and $n_2$ satisfies a relationship of $n_1 < n_2$ in order to permit the optical wave-guide path to function.

Thus formed optical wave-guide path layer 8 has a smooth slope (smooth step construction) in the region that extends from the end face of the light-blocking film layer 5 toward the photo-detector 3 owing to the insulator film layers 4 and 6 having the above-mentioned staircase construction and the clad layer 7 formed thereon which has a smooth slope, thus resultantly enabling guiding light with a low loss along this smooth slope.

Furthermore, it was confirmed that even with the overall height of the staircase-like steps of a value on the micrometer order, light can be guided with a low radiation loss.

Figure 3:
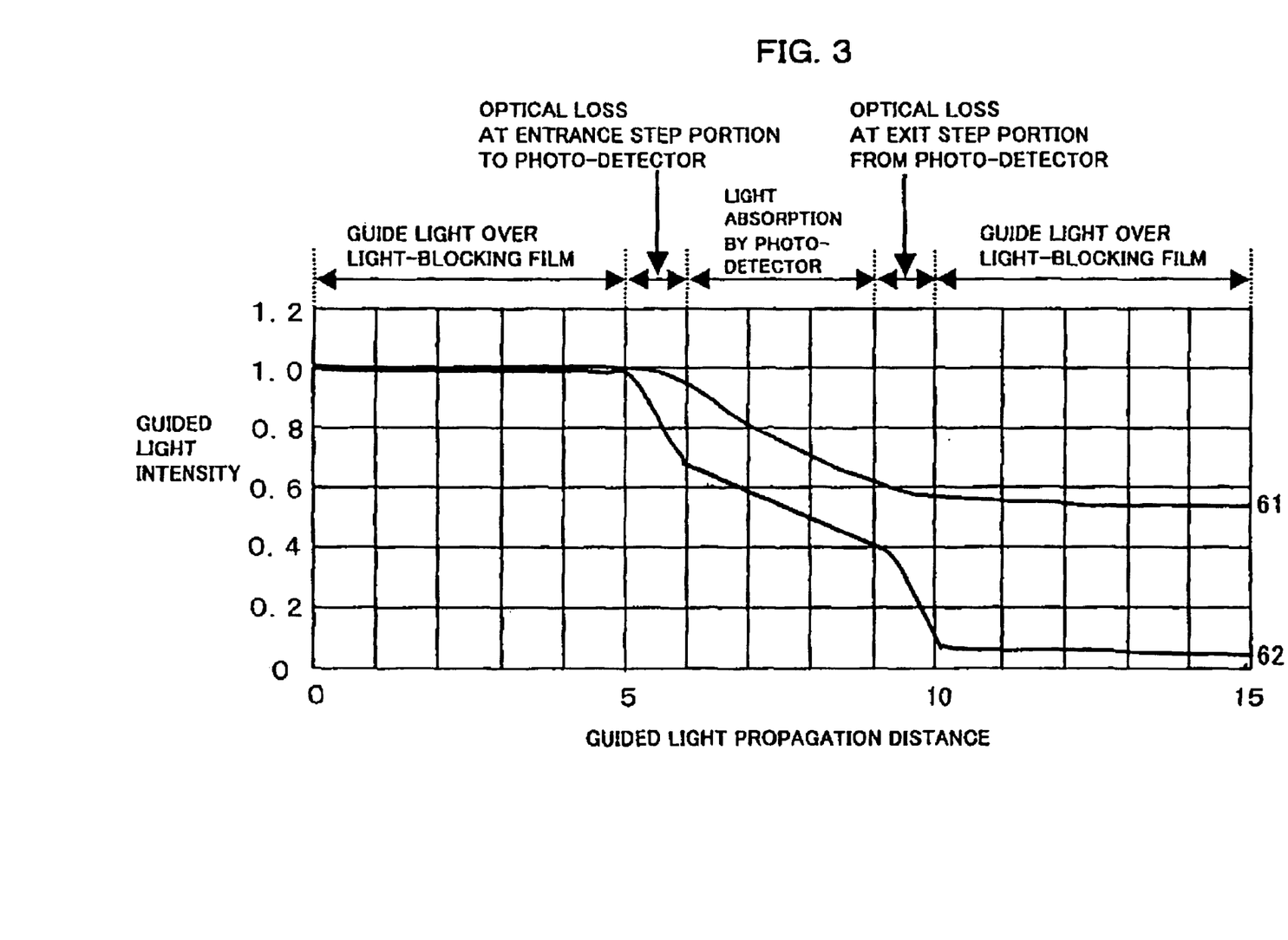
FIG. 3 is a graph for showing comparison of propagated light intensity between a prior art optical IC and an optical IC of the embodiment.

FIG. 3 shows comparison of propagated light intensity between a prior art optical IC and an optical IC of the embodiment. In FIG. 3, curve 61 indicates a relationship between the intensity of guided light and its propagation distance when the optical IC 1 of this embodiment is used and curve 62 indicates that relationship when the optical IC 1 according to the prior art is used. As shown in FIG. 3, the optical IC 1 of this embodiment (indicated by curve 61) exhibits a remarkable decrease in optical loss a the entrance step portion to and the exit step portion from the photo-detector 3.

Figure 4:
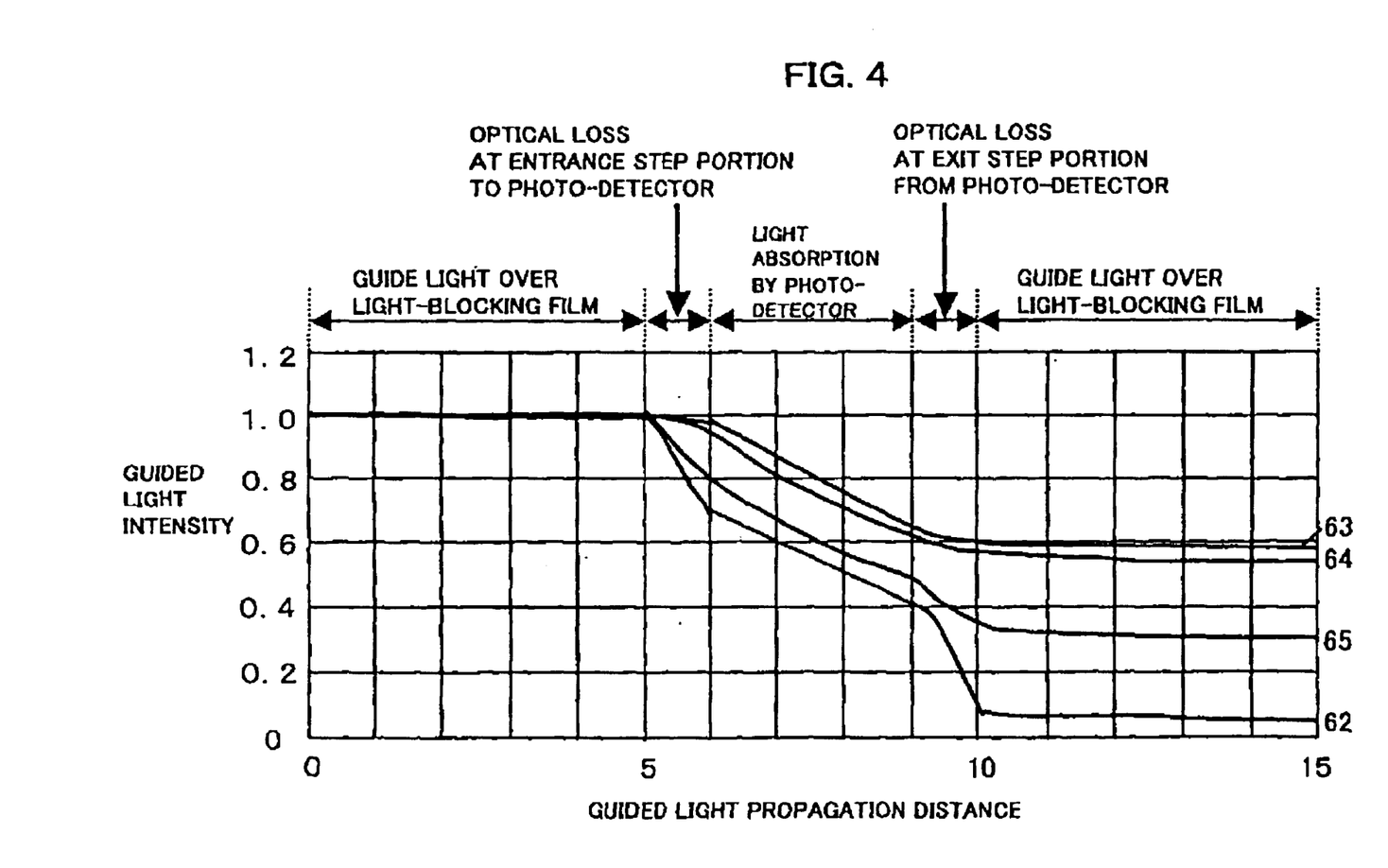
FIG. 4 is a graph for showing comparison of a propagated light intensity with respect to both a relationship of a horizontal staircase-like step length (an interval of staircase-like step) owing to insulator film layers 4 and 6 and a film thickness of a light-blocking film layer 5 and a relationship between a film thickness of the insulator film layers 4 and 6 and that of the light-blocking film layer 5.

Further, FIG. 4 shows comparison of the propagated light intensity with respect to both a relationship of the horizontal staircase-like step length owing to the insulator film layers 4 and 6 and the film thickness of the light-blocking film layer 5 and a relationship between the film thickness of the insulator film layers 4 and 6 and that of the light-blocking film layer 5. In FIG. 4, curve 63 indicates the comparison in a case where the horizontal staircase-like step length owing to the insulator film layers 4 and 6 is set to ⅔ of a film thickness of the light-blocking film layer 5 and also the film thickness of the insulator film layers 4 and 6 is set at ⅔ of that of the light-blocking film layer 5. Moreover, curve 64 indicates that in a case where the horizontal staircase-like step length owing to the insulator film layers 4 and 6 is set at ½ of the film thickness of the light-blocking film layer 5 and also the film thickness of the insulator film layers 4 and 6 is set at ⅓ of that of the light-blocking film layer 5. Curve 65 indicates that in a case where the horizontal staircase-like step length owing to the insulator film layers 4 and 6 is set at ½ of the film thickness of the light-blocking film layer 5 and also the film thickness of the insulator film layers 4 and 6 is set at ¼ of that of the light-blocking film layer 5 or a case where that horizontal length is set at ⅓ of the film thickness of the light-blocking film layer 5 and also the film thickness of the insulator film layers 4 and 6 is set at ⅓ of that of the light-blocking film layer 5. Curve 62 indicates the characteristics of the prior art optical IC like in FIG. 3.

As indicated by curve 64, the optical loss is decreased remarkably in the case where the horizontal staircase-like step length owing to the insulator film layers 4 and 6 is set at ½ of the film thickness of the light-blocking film layer 5 and also the film thickness of the insulator film layers 4 and 6 is set at ⅓ of that of the light-blocking film layer 5. As indicated by curve 63, on the other hand, the optical loss is further decreased remarkably in the case where the horizontal staircase-like step length owing to the insulator film layers 4 and 6 is set at ⅔ of the film thickness of the light-blocking film layer 5 and the film thickness of the insulator film layers 4 and 6 is set at ⅔ of that of the light-blocking film layer 5.

As mentioned above, this embodiment provides such a construction that the multi-layer film underlying the clad layer forms moderate steps in a staircase at the boundary between the photo-detector and any other portions, so that by applying by means of spin-coating there on and hardening a liquefied derivative material prepared to have appropriate viscosity, it is possible to form an optical wave-guide path layer that has a smooth slope (that is, smooth step structure), thus resultantly guiding light with a low loss. In addition, this makes it possible to reduce the scatter loss of an optical signal at the bent portion of the light-blocking film layer 5.

Furthermore, in such staircase-like steps, by setting the horizontal staircase-like step length to at least ½ of the film thickness of the light-blocking film layer and the film thickness of the insulator film layers to at least ⅓ of that of the light-blocking film layer and also by forwardly tapering the end face of the insulator film layers (so that the angle "AG" between the end face of the insulator film layer and the surface of the photo-detector may satisfy a relationship of 0<AG<90 degrees), the step construction can be made even smoother, thus realizing a low-loss wave-guide path layer with a decreased radiation loss even at the staircase-like step with a value on the micrometer order.

Furthermore, it is unnecessary to polish the steep step at the boundary of the light-blocking film layer for improvement of the performance, so that this steep step can be smoothed only by etching and spin-coating a liquefied derivative material prepared to have appropriate viscosity and then hardening it, thus manufacturing the optical IC simply and inexpensively.

Further, by providing almost the same step construction also on the side where light once guided through the wave-guide path layer into the photo-detector gets out of it, the light can be detected again also at such another photo-detector having almost this same step construction that is provided behind the original one.

Figure 5:
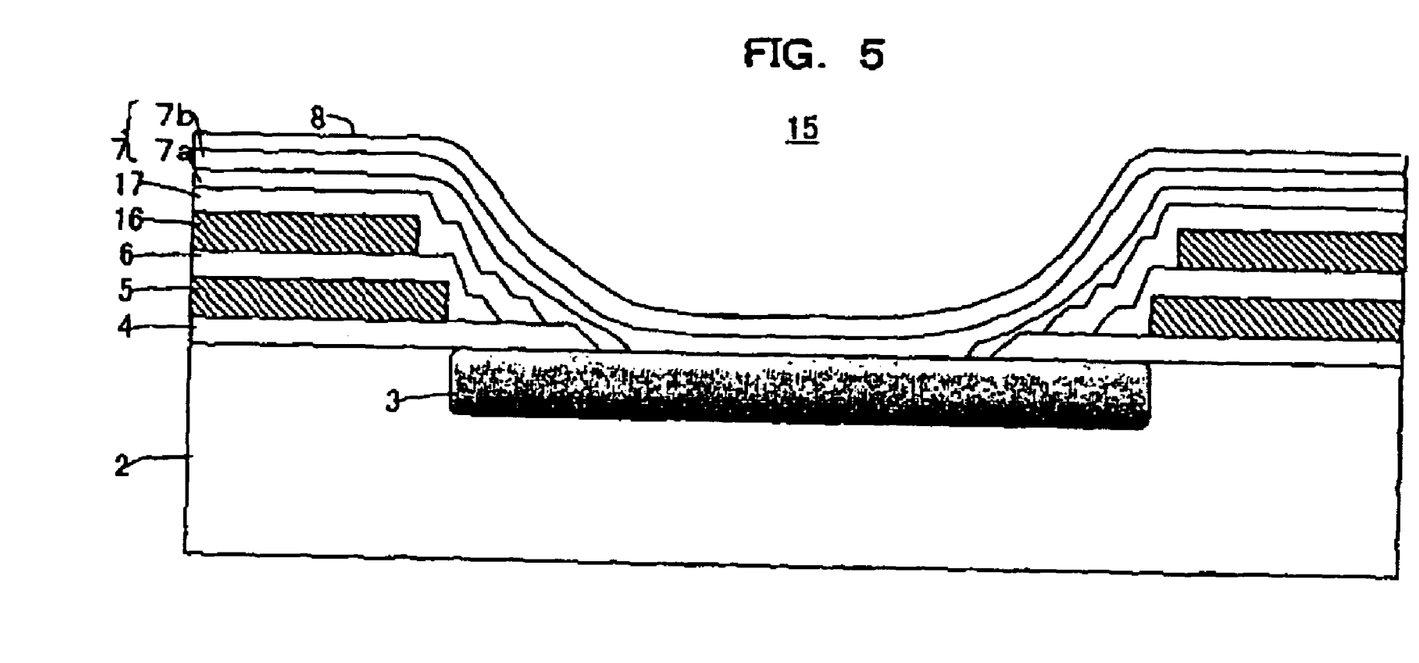
FIG. 5 is a cross-sectional view for showing an example of a construction of the optical IC according to another embodiment.

FIG. 5 is a cross-sectional view of an example of a construction of the optical IC according to another embodiment different from that of FIG. 1, assuming multi-layer wiring. The same elements in FIG. 5 as those in FIG. 1 are indicated by the same reference numerals.

An optical IC 15 shown in FIG. 5 comprises the structure of FIG. 1 plus a second light-blocking film layer 16 and a third insulator film layer 17. In FIG. 5, the second light-blocking film layer 16 is formed on the second insulator film layer 6, in such a configuration that the second light-blocking film layer 16 is buried by and sandwiched between the second insulator film layer 6 and the third insulator film layer 17, the end face of which is formed be etching on the first insulator film layer 4. Like in the optical IC 1 shown in FIG. 1, these insulator film layers are combined to form a staircase construction and each have a forward tapered end face. On thus formed multi-layer structure are formed the clad layer 7 and the optical wave-guide path layer 8.

In such a configuration, like in the case of the optical IC1 shown in FIG. 1, the optical wave-guide path layer 8 has a smooth slope from the end of the light-blocking film layer 5 toward the photo-detector 3, thus resultantly being able to guide light with a low loss along such a smooth slope.

Although this example shown in FIG. 5 adds one light-blocking film layer and one insulator film layer to the structure of the optical IC1 shown in FIG. 1, it may further add any other to likewise form a staircase construction by means of the insulator film layers, thus obtaining almost the same effects as the above. In addition, even if the numbers of the light-blocking film layers and the insulator film layers are thus increased to result in the substrate having a higher step, these insulator film layers can be combined to form a staircase construction to thereby provide the optical wave-guide path layer 8 with a smooth slope, thus guiding light with a low loss.

Figure 6A:
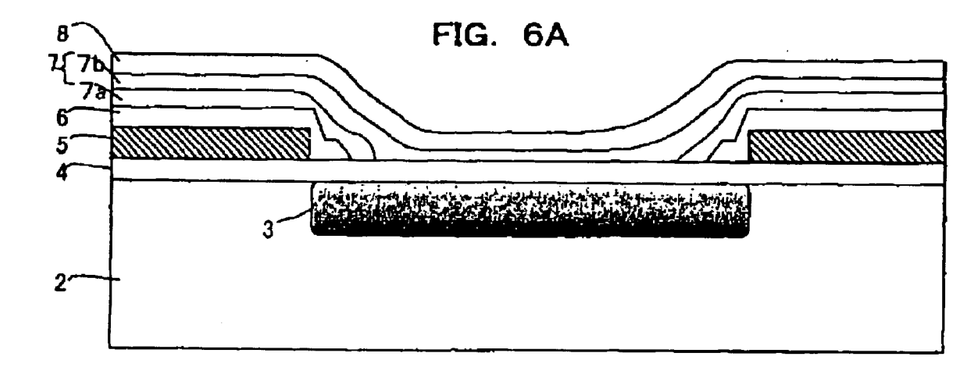
FIGS. 6A and 6B are cross-sectional views for showing an example of a construction of the optical IC according to a further embodiment.
Figure 6B:
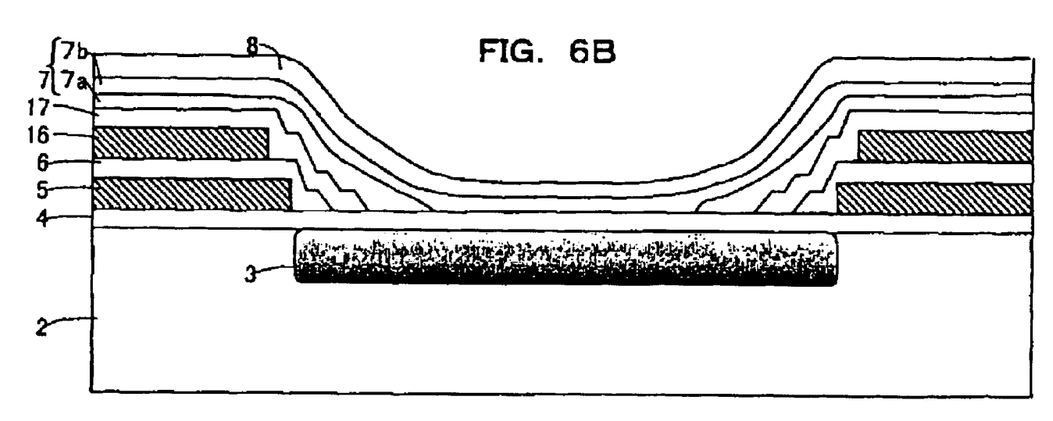

Although the step of the first insulator film layer 4 is formed on the photo-detector 3 on the substrate 2 in the optical IC shown in FIGS. 1 and 5, the present invention is not limited thereto; for example, as shown in FIG. 6A and 6B, the first insulator film layer 4 may be formed so as to cover the photo-detector 3 thoroughly.

Furthermore, the upper clad layer may be formed on the optical wave-guide path layer 8 in the optical IC shown in FIGS. 1 and 5.

Furthermore, although the substrate 2 is made of silicon in the above embodiments, the present invention is not limited thereto; it is made of any other appropriate material.

Furthermore, although the above embodiments have exemplified thermally oxidized $SiO_2$ as a material of the insulator film layer 4, the present invention is not limited thereto; for example, the insulator film layer 4 and the others may be made of $SiO_2$, $Si_3N_4$, BPSG, etc. formed by CVD or sputtering or a multi-layer film thereof.

As mentioned above, by the present invention, a multi-layer film underlying the clad layer is adapted to form, in construction, steps in a staircase at the boundary between the photo-detector and any other portions, so that when the clad layer is formed thereon, the optical wave-guide path layer can have a smooth slope (that is, smooth step structure) formed thereon, to thereby guide light with a low loss. It also makes it possible to reduce the scatter loss of an optical signal at the bent portion of the light-blocking film layer.

Furthermore, it is unnecessary to polish the steep step at the boundary of the light-blocking film layer for improvement of the performance, so that this steep step at the boundary of the light-blocking film layer can be smoothed only by etching processing and also applying, by spin-coating, and hardening a liquefied derivative material prepared to have appropriate viscosity, thus manufacturing the optical IC simply and inexpensively.

The entire disclosure of Japanese Patent Application No. 2001-77824 filed on Mar. 19, 2001 including the specification, claims, drawings and summary is incorporated herein by reference in its entirety.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

What is claimed is:

1. An optical integrated circuit comprising:
    a photo-detector formed on a substrate;
    at least one light-blocking film layer which is formed in a portion of a main surface of the substrate other than the portion where the photo-detector is formed;
    at least two insulator film layers which are formed so as to cover the light-blocking film layer;
    a clad layer which is formed consecutively over the flight-detector and the insulator film layers; and
    an optical wave-guide path layer formed on the clad layer, wherein the clad layer is formed in a smooth slope toward the photo-detector.

2. The optical integrated circuit according to claim 1, wherein the insulator film layers form a plurality of staircase-like steps, each of which has a horizontal measuring at least ½ of a maximum film thickness of the light-blocking film layer.

3. The optical integrated circuit according to claim 1, wherein the insulator film layers each have a film thickness measuring at least ⅓ of the maximum film thickness of the light-blocking film layer.

4. The optical integrated circuit according to claim 1, wherein the insulator film layer have an inclined face having an inclination angle smaller than 90 degrees toward the photo-detector.

5. The optical integrated circuit according to claim 1, wherein the lowest one of the insulator film layers is formed so as to cover the photo-detector.

6. An optical integrated circuit comprising:
    a photo-detector formed on a substrate;
    at least one light-blocking film layer which is formed in a portion of a main surface of the substrate other than the portion where the photo-detector is formed;
    at least two insulator film layers which are formed so as to cover the light-blocking film layer;
    a clad layer which is formed consecutively over the light-detector and the insulator film layers; and
    an optical wave-guide path layer formed on the clad layer, wherein the insulator film layers form a plurality of staircase-like steps toward the photo-detector.

7. The optical integrated circuit according to claim 6, wherein each of the steps has a horizontal length measuring at least ½ of a maximum film thickness of the light-blocking film layer.

8. The optical integrated circuit according to claim 6, wherein the insulator film layers each have a film thickness measuring at least ⅓ of the maximum film thickness of the light-blocking film layer.

9. The optical integrated circuit according to claim 6, wherein the insulator film layer have an inclined face having an inclination angle smaller than 90 degrees toward the photo-detector.

10. The optical integrated circuit according to claim 6, wherein the lowest one of the insulator film layers is formed so as to cover the photo-detector.

11. A method for manufacturing an optical integrated circuit, comprising:
    a process of forming at least one light-blocking film layer in a portion of a main surface of a substrate other than the portion where a photo-detector is formed;
    a process of forming a insulator film layer having a staircase-like step so as to cover the light-blocking film layer toward the photo-detector;
    a process of forming a clad layer having a smooth slope by pouring a liquefied derivative material prepared to have appropriate viscosity onto the staircase-like step; and
    a process of forming an optical wave-guide path layer on the clad layer.

* * * * *